United States Patent
Smethers

(10) Patent No.: US 7,065,386 B1
(45) Date of Patent: *Jun. 20, 2006

(54) METHOD AND SYSTEM FOR PROCESSING OVERLOADED KEYS OF A MOBILE DEVICE

(75) Inventor: Paul A. Smethers, Seattle, WA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/976,420

(22) Filed: Oct. 29, 2004

Related U.S. Application Data

(63) Continuation of application No. 09/611,474, filed on Jul. 7, 2000, now Pat. No. 6,907,273.

(51) Int. Cl.
 *H04B 1/38* (2006.01)
 *H04M 1/00* (2006.01)

(52) U.S. Cl. ............ 455/565; 455/550.1; 455/556.2; 455/418; 345/168

(58) Field of Classification Search ........... 455/565, 455/566, 418, 550.1, 556.2; 379/386, 283; 345/168
See application file for complete search history.

(56) References Cited

U.S. PATENT DOCUMENTS

| | | | |
|---|---|---|---|
| 4,617,657 A | 10/1986 | Drynan et al. | |
| 4,908,848 A | 3/1990 | Hanawa | |
| 4,945,556 A | 7/1990 | Namekawa | |
| 5,157,719 A * | 10/1992 | Waldman | 379/355.05 |
| 5,199,104 A | 3/1993 | Hirayama | |
| 5,247,565 A | 9/1993 | Joglekar et al. | |
| 5,425,077 A | 6/1995 | Tsoi | |
| 5,481,539 A | 1/1996 | Hershey et al. | |
| 5,486,846 A | 1/1996 | Comer et al. | |
| 5,559,512 A | 9/1996 | Jasinski et al. | |
| 5,692,032 A | 11/1997 | Seppänen et al. | |
| 5,737,560 A | 4/1998 | Yohanan | |
| 5,751,708 A | 5/1998 | Eng et al. | |
| 5,761,280 A | 6/1998 | Noonen et al. | |
| 5,797,098 A | 8/1998 | Schroeder et al. | |
| 5,802,516 A | 9/1998 | Shwarts et al. | |
| 5,809,415 A | 9/1998 | Rossmann | |
| 5,848,356 A | 12/1998 | Jambhekar et al. | |
| 5,864,765 A | 1/1999 | Barvesten | |

(Continued)

FOREIGN PATENT DOCUMENTS

EP 0 633 684 A2 1/1995

(Continued)

OTHER PUBLICATIONS

UP.Browser™ User Handbook, Unwired Planet, Inc., Nov. 1997.

(Continued)

*Primary Examiner*—Joseph Feild
*Assistant Examiner*—Kamram Afshar
(74) *Attorney, Agent, or Firm*—Townsend and Townsend and Crew LLP

(57) ABSTRACT

Improved approaches are disclosed for processing overloaded keys substantially more in accordance with user's expected behavior. With the improved approaches, users are less likely to undergo unexpected processing in response to overloaded key presses. In one embodiment, the processing ignores certain overloaded key presses and/or imposes delays to ensure that users have an opportunity to appreciate when an overloaded key has switched to another function. These approaches are particularly well suited for small-scale mobile devices having reduced size displays and overloaded keys such as mobile phones (e.g., cellular phones), two-way pagers, Personal Digital Assistants (PDAs), or other two-way mobile communication devices.

10 Claims, 7 Drawing Sheets

U.S. PATENT DOCUMENTS

| | | |
|---|---|---|
| 5,917,905 A | 6/1999 | Whipple et al. |
| 5,987,336 A | 11/1999 | Sudo et al. |
| 6,008,738 A | 12/1999 | Kudah |
| 6,125,287 A | 9/2000 | Cushman et al. |
| 6,144,863 A | 11/2000 | Charron |
| 6,256,516 B1 * | 7/2001 | Wagner et al. ............... 455/565 |
| 6,332,024 B1 | 12/2001 | Inoue et al. |
| 6,580,917 B1 | 6/2003 | Lefevre et al. |
| 6,591,117 B1 * | 7/2003 | Kim ........................... 455/566 |
| 6,597,345 B1 * | 7/2003 | Hirshberg ................... 345/168 |
| 6,724,405 B1 * | 4/2004 | Matthews et al. ........... 715/773 |
| 6,907,273 B1 * | 6/2005 | Smethers .................... 455/565 |
| 2002/0028697 A1 | 3/2002 | Davies |
| 2002/0058536 A1 | 5/2002 | Horii et al. |
| 2002/0118396 A1 * | 8/2002 | Kawai ........................ 358/402 |
| 2005/0129241 A1 * | 6/2005 | Hardy et al. ................ 380/270 |

FOREIGN PATENT DOCUMENTS

| | | |
|---|---|---|
| EP | 0 689 122 A1 | 12/1995 |
| EP | 0 844 553 A1 | 5/1998 |
| JP | 2001-331262 | 11/2001 |
| WO | WO 96/32824 | 10/1996 |

OTHER PUBLICATIONS

"HDTP Specification", Version 1.1-Draft, Unwired Planet, Inc., Jul. 15, 1997.

HDML 2.0 Language Reference, Version 2.0, Unwired Planet, Inc., Software Developer Kit, Jul. 1997.

"Wireless Application Protocol Architecture Specification" (WAP Architecture), Version 30, Apr. 1998.

* cited by examiner

METHOD AND SYSTEM FOR PROCESSING OVERLOADED KEYS OF A MOBILE DEVICE

CROSS REFERENCE TO RELATED APPLICATIONS

This application is a continuation of application Ser. No. 09/611,474, filed Jul. 7, 2000, now U.S. Pat. No. 6,907,273 from which priority under 35 U.S.C. §120 is claimed, and which is incorporated herein by reference.

BACKGROUND OF THE INVENTION

1. Field of the Invention

The present invention relates to mobile devices and, more particularly, to processing overloaded keys on mobile devices.

2. Description of the Related Art

Computing devices normally provide text entry capabilities for users. With desktop and laptop computers, text entry is facilitated by a full-size (or nearly full-size) keyboard and a pointing device. The pointing device can be a mouse, a trackball, etc. which serves to move a cursor. Unfortunately, small-scale computing devices (e.g., cellular phones, two-way pagers, etc.) tend to have limited size keypads and lack any pointing device to provide cursor movement. As a result, it is often tedious and time consuming for users to navigate to different screens or applications available on these small-scale computing devices.

Small-scale computing devices often support various applications. One such application that has recently become popular for those small-scale computing devices with network access is a browser application. A browser application displays screens on displays associated with the computing devices. Some small-scale computing devices provide special purpose keys (buttons) for performing various functions such as BACK, CLEAR, and EXIT. The back function causes a prior screen to be displayed. The clear function operates to delete a character to left of the cursor. The exit function operates to exit the current application. However, given the limited number of keys (buttons) these small-scale computing devices can support, overloaded keys are often used. An overloaded key allows two or more functions to share the same key. Examples of overloaded keys include a Clear/Back key and a Back/Exit key.

Unfortunately, when users use overloaded keys they focus on only a single of its functions. As a result, users frequently unexpectedly press the overloaded key too many times which causes its function to change and thus cause unexpected actions. These unexpected actions are not only frustrating to users but can also lead to a loss of data or incurring additional charges.

Thus, there is a need for improved techniques to process overloaded keys on a small-scale computing device.

SUMMARY OF THE INVENTION

Broadly speaking, the invention relates to improved approaches for processing overloaded keys substantially more in accordance with user's expected behavior. With the improved approaches, users are less likely to undergo unexpected processing in response to overloaded key presses. In one embodiment, the processing ignores certain overloaded key presses and/or imposes delays to ensure that users have an opportunity to appreciate when an overloaded key has switched to another function. The invention is particularly well suited for small-scale mobile devices having reduced size displays and overloaded keys such as mobile phones (e.g., cellular phones), two-way pagers, Personal Digital Assistants (PDAs), or other two-way mobile communication devices.

The invention can be implemented in numerous ways, including as a method, a computer readable medium, an apparatus, and a system. Several embodiments of the invention are discussed below.

As a method for processing an overloaded key on a mobile device, one embodiment of the invention includes at least the acts of: receiving a key press of the overloaded key to be processed from a buffer; determining whether the function of the overloaded key has switched; and clearing any subsequent overloaded key presses of the overloaded key from the buffer when the determining determines that the function of the overloaded key has switched.

As a method of processing a Clear/Back key on a computing device having a display, one embodiment of the invention includes at least the acts of: displaying user entered text in a text entry screen on the display of the computing device; displaying a cursor at the end of the user entered text on the display of the computing device; receiving a Clear/Back key press; determining whether at least one character of the user entered text remains backwards from the cursor; deleting the character immediately backwards from the cursor when it is determined that at least one character of the user entered text remains backwards from the cursor; determining whether the deleting has caused no more characters of the user entered text to remain; setting a timestamp when it is determined that the deleting has caused no more characters of the user entered text to remain; determining whether a predetermined amount of time has passed since the timestamp was set with respect to a previous Clear/Back key press when it is determined that no characters of the user entered text remain backwards from the cursor; ignoring the Clear/Back key press when it is determined that the predetermined amount of time has not yet passed since the timestamp was set; and returning back to a prior screen when it is determined that the predetermined amount of time has passed since the timestamp was set.

As a method of processing a Back/Exit key on a computing device having a display, one embodiment of the invention includes at least the acts of: (a) receiving a Back/Exit key press while operating in a first application mode on the computing device; (b) determining whether a home screen is presently being displayed on the display; (c) returning to display of a prior screen on the display when the determining (b) determines that the home screen is not presently being displayed; (d) determining whether the prior screen is the home screen; (e) storing a time indication when the returning (c) displays the prior screen if the determining (d) determines that the prior screen is the home screen; (f) determining whether the home screen has been displayed for at least a predetermined amount of time based on the stored time indication when the determining (b) determines that the home screen is presently being displayed; (g) ignoring the Back/Exit key press when the determining (f) determines that the home screen has not been displayed for at least the predetermined amount of time; and (h) exiting the first application mode when the determining (f) determines that the home screen has been displayed for at least the predetermined amount of time.

As a computer readable medium including at least computer program code for processing an overloaded key on a mobile device, one embodiment of the invention includes at least: computer program code for receiving a key press of the overloaded key to be processed from a buffer; computer program code for determining whether the function of the overloaded key has just switched; and computer program code for clearing any subsequent overloaded key presses of the overloaded key from the buffer when the computer program code for determining determines that the function of the overloaded key has just switched.

As a mobile device, one embodiment of the invention includes at least: a display configured to display text entered by a user; a keypad to facilitate text entry by the user, the keypad including at least an overloaded key that serves a plurality of functions; a buffer for storing key presses entered by the user via the keypad; and a processor configured to control operation of the mobile device. The processor being configured to provide context sensitive processing of overloaded key presses by operating to receive a key press of the overloaded key to be processed from the buffer, determine whether the function of the overloaded key has just switched, and clear any subsequent overloaded key presses of the overloaded key from the buffer when it is determined that the function of the overloaded key has just switched.

As a computer readable medium including at least computer program code for processing a multi-function key on a mobile device, one embodiment of the invention includes at least: computer program code for receiving a key press of the multi-function key to be processed; computer program code for determining whether the function of the multi-function key has changed since last pressed; and computer program code for determining whether to ignore the key press of the multi-function key or to process the key press of the multi-function key press with the function being changed.

The advantages of the invention are numerous. Different embodiments or implementations may yield one or more of the following advantages. One advantage of the invention is that an overloaded key operates more in accordance with expected behavior. Another advantage of the invention is that a user will make fewer mistakes and reduce undesired data loss.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved approaches for processing overloaded keys substantially more in accordance with user's expected behavior. With the improved approaches, users are less likely to undergo unexpected processing in response to overloaded key presses. An overload key is a key (e.g., multi-function key) that performs two or more functions depending on context of use. In one embodiment, the processing ignores certain overloaded key presses and/or imposes delays to ensure that users have an opportunity to appreciate when an overloaded key has switched to another function.

The invention is particularly well suited for small-scale mobile devices having reduced size displays and overloaded keys such as mobile phones (e.g., cellular phones), two-way pagers, Personal Digital Assistants (PDAs), or other two-way mobile communication devices. Such devices typically have significantly less memory and processing capability than is found in desktop and laptop computers. These devices typically have small display screens and limited size keypads as compared to the keyboards and display screens associated with desktop or laptop computers.

In the following detailed description of the invention, numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the invention.

Embodiments of the invention are discussed below with reference to FIGS. 1A–4. However, those skilled in the art will readily appreciate that the detailed description given herein with respect to these figures is for explanatory purposes as the invention extends beyond these limited embodiments.

Figure 1A:
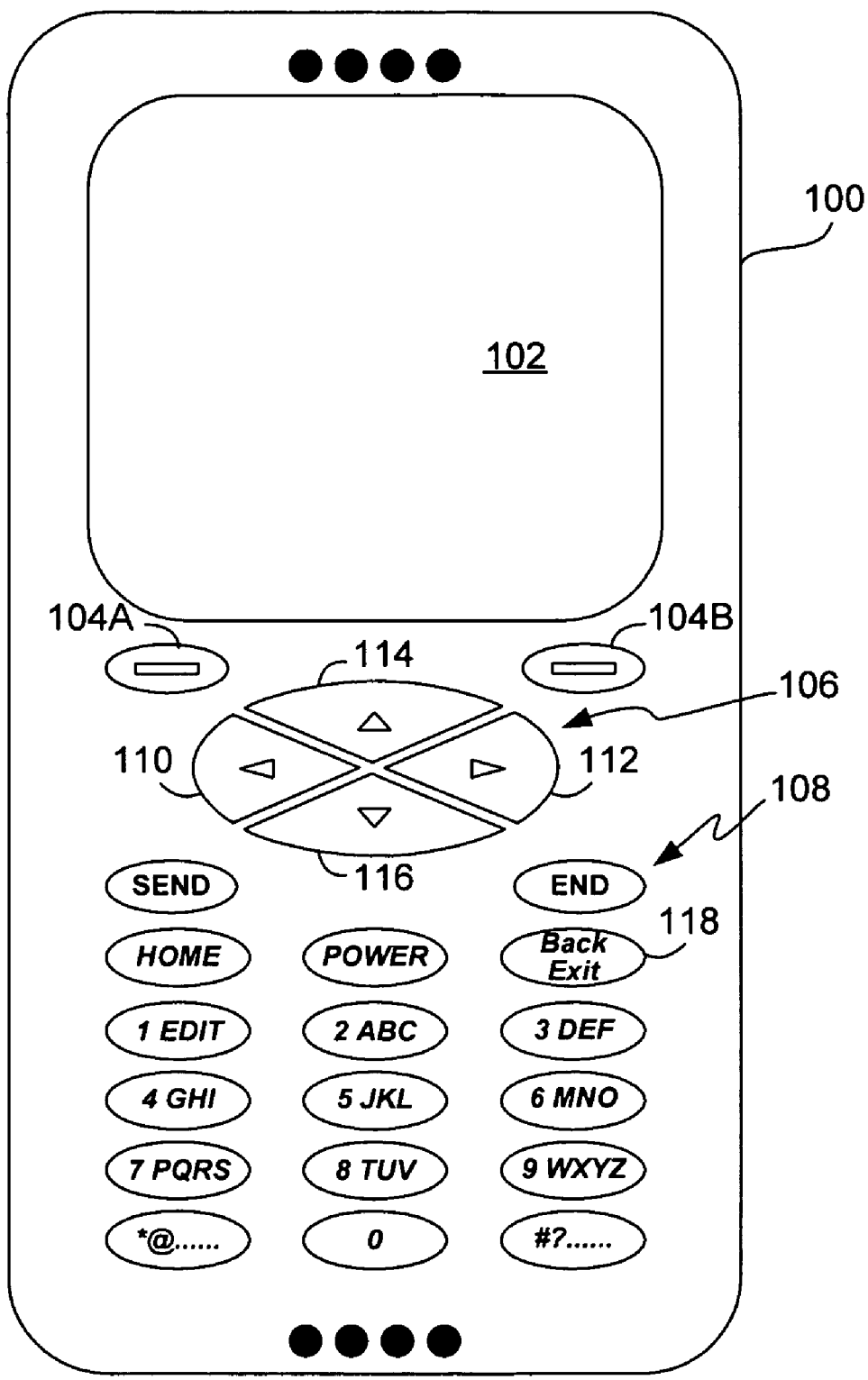
FIG. 1A is a diagram of a mobile device according to one embodiment of the invention.

FIG. 1A is a diagram of a mobile device 100 according to one embodiment of the invention. The mobile device 100 is also referred to as a two-way mobile communication device. The mobile device 100 communicates with remote entities through a wireless network (not shown). Examples of commonly used wireless networks include Cellular Digital Packet Data (CDPD), Global System for Mobile Communications (GSM), Code Division Multiple Access (CDMA) and Time Division Multiple Access (TDMA), to name a few. The mobile device 100 can operate various applications. Exemplary applications include an email application, an address book application, a notebook application, and a network browser application. The network browser provided by the network browser application is, for example, a HTML browser, a HDML browser, or a WML browser.

The mobile device 100 includes an enhanced display 102 capable of displaying information (e.g., menus, lists, text, graphics). The mobile device 100 also includes soft keys 104A and 104B, navigation key group 106, and a phone keypad 108. A typical phone keypad, as commonly seen, comprises twelve buttons. Of the twelve buttons, ten buttons are consecutively numbered "0" to "9", one button is for "⊖" sign and the other button is for "#" sign. Besides such typical buttons, the phone keypad 108 of the mobile device 100 may contain extra buttons which provide added convenience and functionality. In this embodiment, the extra buttons include various miscellaneous keys. A Back/End button 118 is referred to as an overloaded key (button) as it supports multiple functions. Other exemplary miscellaneous keys in this embodiment include SEND, END, POWER, and HOME. The general functionality of the miscellaneous keys are well known in the art. The navigation key group 106 includes four buttons (keys), a left arrow button 110, a right arrow button 112, an up arrow button 114, and a down arrow button 116.

Figure 1B:
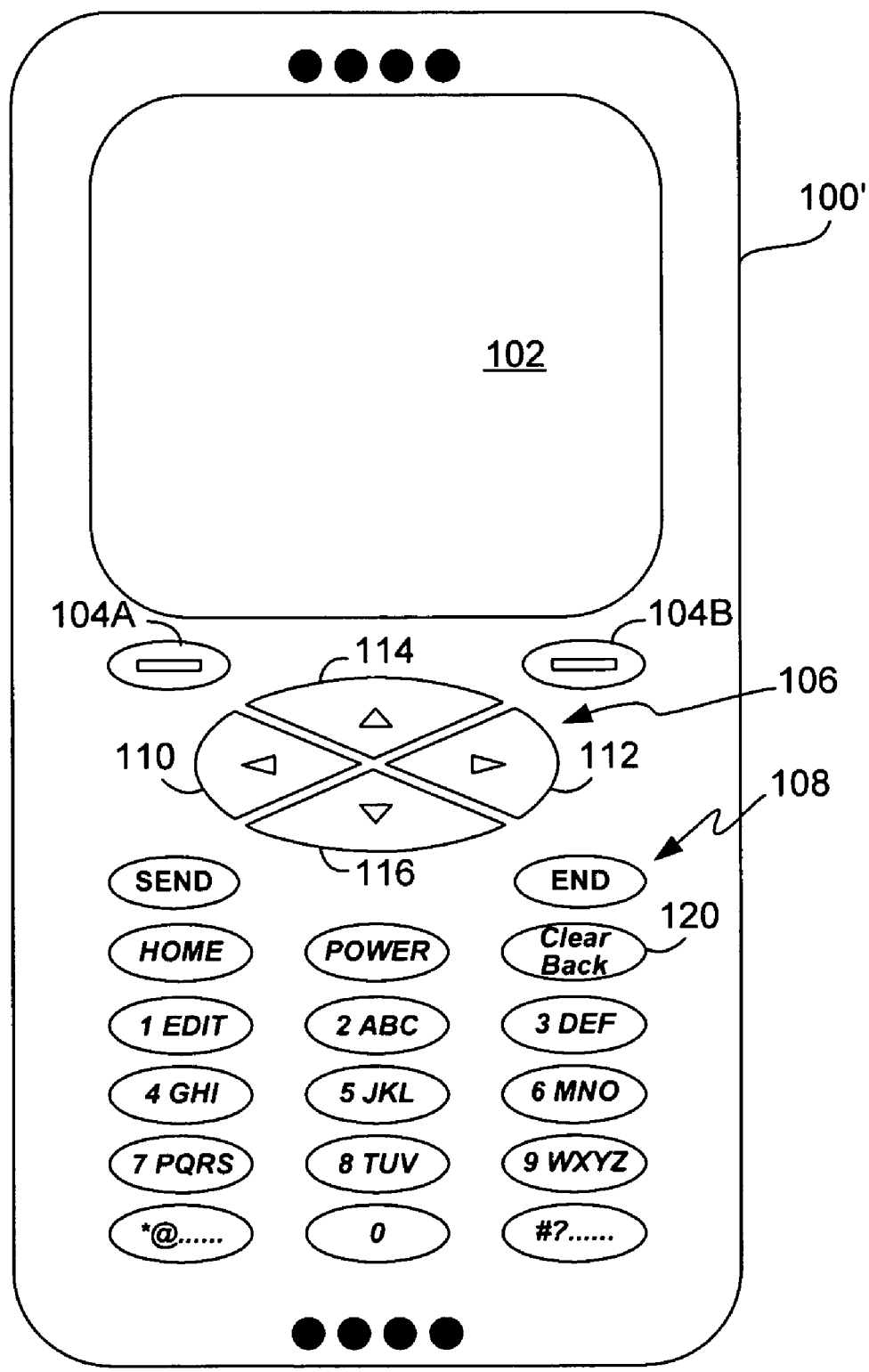
FIG. 1B is a diagram of the mobile device according to another embodiment of the invention.

FIG. 1B is a diagram of the mobile device 100' according to another embodiment of the invention. The mobile device 100' is the same as that illustrated in FIG. 1A except that the overloaded key is a Clear/Back key 120 instead of the Back/Exit key 118.

The invention pertains to the processing performed upon pressing of an overloaded key (button) of a mobile device. FIGS. 1A and 1B illustrate representative overloaded keys, namely, the Back/End button 118 and the Clear/Back button 120. However, the invention is applicable to various other overloaded keys (buttons). Further, it is to be understood by those of ordinary skill in the art that the invention may be practiced using other types of input interfaces (e.g., soft keys, iconic screens) and keypad configurations.

As used herein, a display is the physical display apparatus of a mobile device. As an example, the display screen can be a Liquid Crystal Display (LCD) screen. A screen is an image presented or displayed on the display.

Figure 1C:
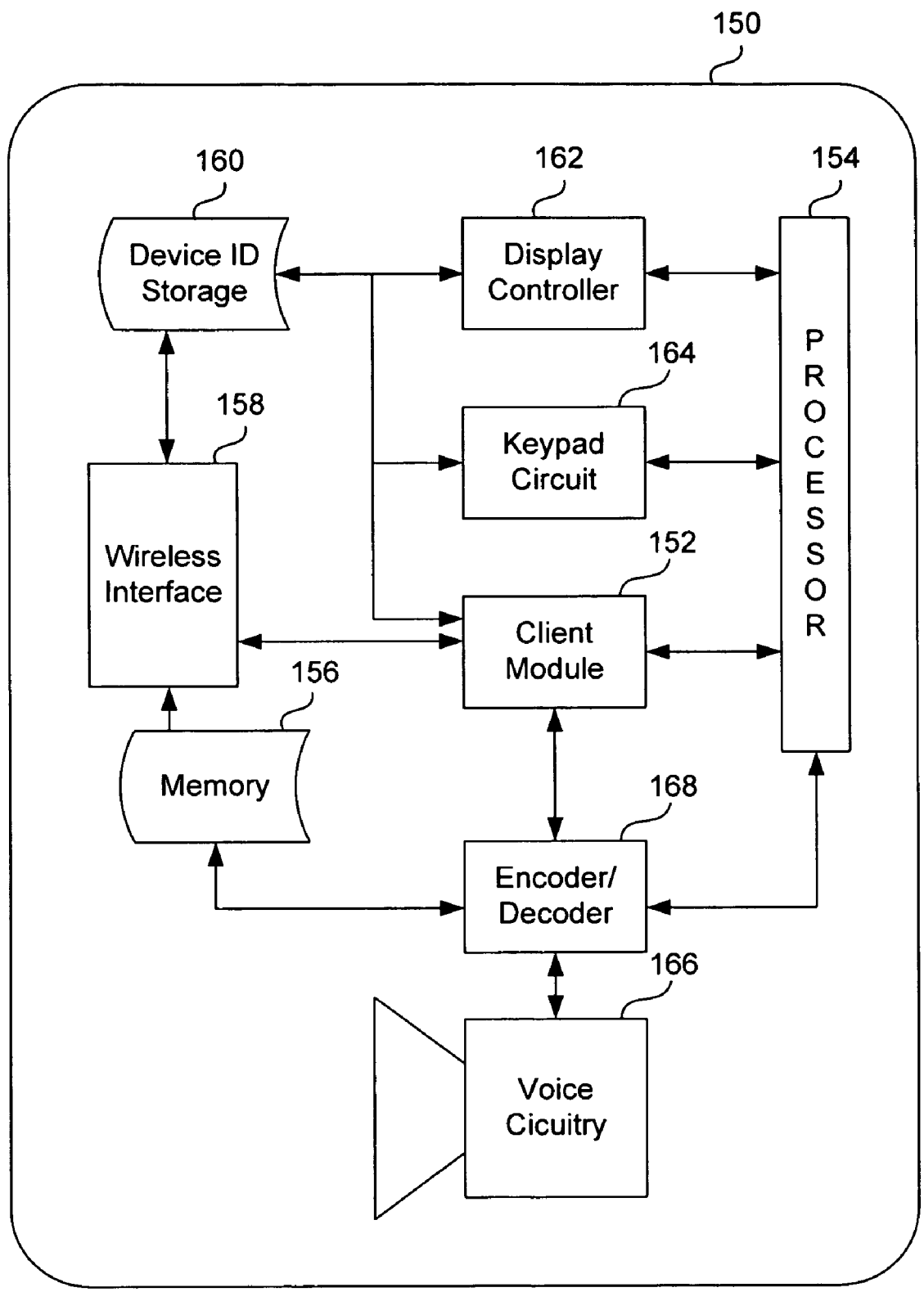
FIG. 1C is a functional block diagram of a mobile device according to one embodiment of the invention.

FIG. 1C is a functional block diagram of a mobile device 150 (also referred to as a two-way mobile communication device) according to one embodiment of the invention. Mobile device 150 is, for example, suitable for use as the mobile device 100 of FIG. 1A or the mobile device 100' of FIG. 1B.

The mobile device 150 includes a client module 152 which works in conjunction with processor 154 and working memory 156 to perform the processing tasks performed by the mobile device 150. These processing tasks include operation of the various applications resident on the mobile device 150, management of communication processing, and management of keypad input.

The mobile device 150 further includes a wireless interface 158 that couples to a wireless network via a RF transceiver (not shown) to receive incoming and outgoing data signals. A device identifier (ID) storage 160 supplies a device ID to the wireless interface 158. The device ID identifies a specific code that is associated with the mobile device 150. As an example, the mobile device 150 can couple to a proxy server (not shown) through the wireless network where the device ID is used to locate a subscriber (user) account provided in the proxy server, and then the proxy server couples to a network such as the Internet.

In addition, mobile device 150 includes a display controller 162 for displaying information on a display, and receives user input from a user via a keypad controlled by keypad circuit 164. Additionally, the client module 152 operates, among other things, a browser, commonly referred to as a micro-browser, requiring much less computing power and memory than well-known HTML browsers do. Additional details on accessing a (proxy) server device from a mobile device using a (micro) browser are described in U.S. Pat. No. 5,809,415 which is hereby incorporated by reference in its entirety.

The mobile device 150 also includes the voice circuitry 166 (e.g., a speaker and a microphone) and the associated hardware (e.g., encoder/decoder 168, processor 154 and keypad circuit 164) which allows it to switch to a telephone mode of operation which is separate and distinct from a network (data) mode of operation.

According to the invention, a user of a mobile device is assisted by the processing of overloaded key presses so that unexpected behavior is substantially reduced or prevented. The processing of overloaded key presses operates to ignore certain overloaded key presses and/or impose delays to ensure that users have an opportunity to appreciate when an overloaded key has switched to another function.

Figure 2:
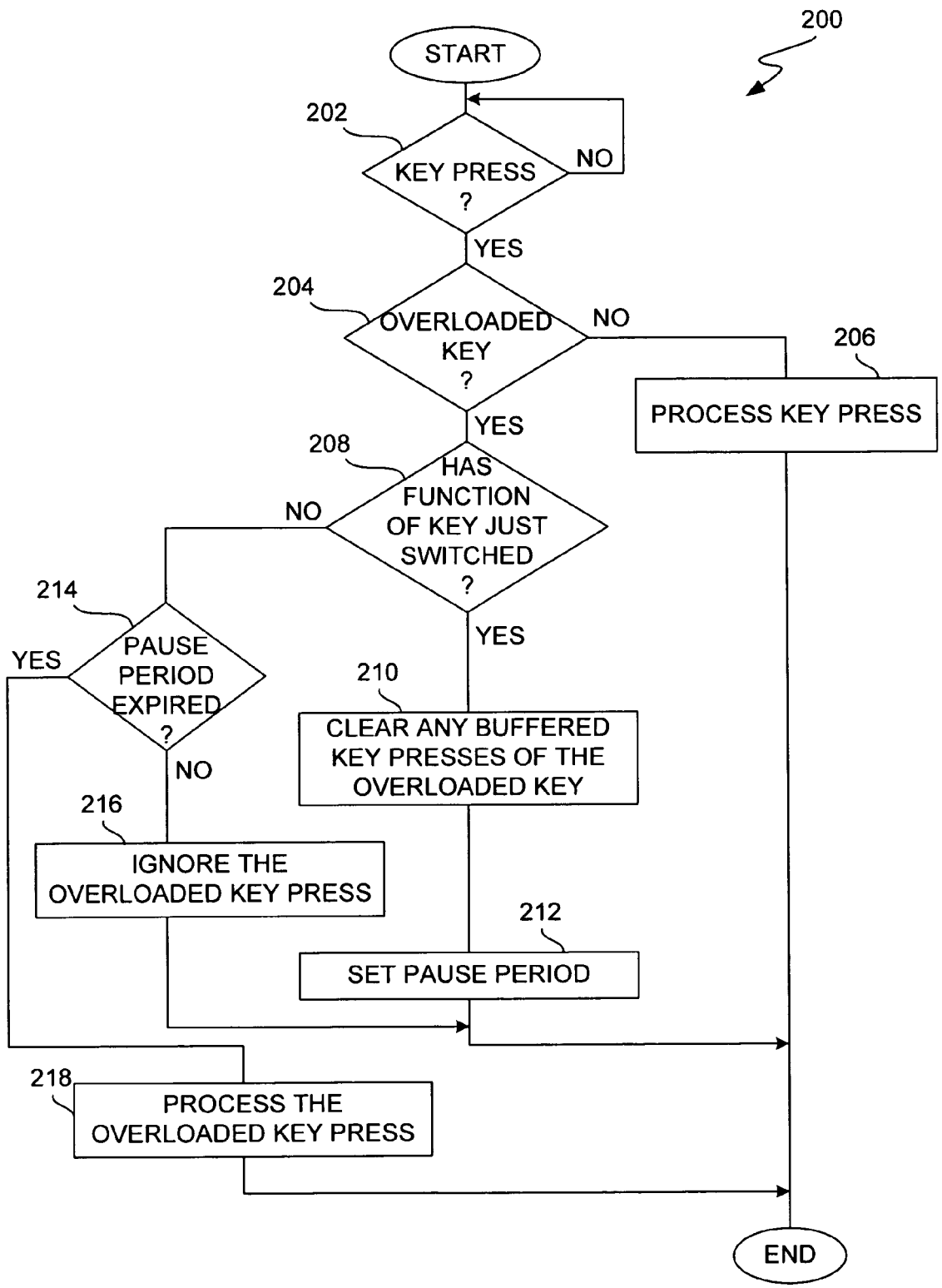
FIG. 2 is a flow diagram of overloaded key processing according to one embodiment of the invention.

FIG. 2 is a flow diagram of overloaded key processing 200 according to one embodiment of the invention. The overloaded key processing 200 is, for example, performed by a mobile device, such as the mobile device 100 of FIG. 1A or the mobile device 100' of FIG. 1B.

The overloaded key processing 200 begins with a decision 202 that determines whether a key (button) press has been detected. When the decision 202 determines that a key press has not yet been detected, the overloaded key processing 200 awaits such a key press. In effect, the overloaded key processing 200 can be invoked when a key press has been detected. Once a key press has been detected, a decision 204 determines whether the key that has been pressed is an overloaded key. An overload key is a key that performs two or more functions depending on context of use. When the decision 204 determines that the key that has been pressed is not an overloaded key, then the key press is processed 206. Here, the key press is processed 206 in a conventional manner because the key is not overloaded to serve multiple functions.

On the other hand, when the decision 204 determines that the key that has been pressed is an overloaded key, then a decision 208 determines whether the function of the key has just switched. The function of the key will be deemed just switched if the last time the overloaded key was pressed a different function was performed than the function currently associated with the current press of the overloaded key. When the decision 208 determines that the function of the key has just switched, then any buffered key presses of the overloaded key are cleared 210. Mobile devices typically buffer key presses because they can occur in rapid succession before the previous key presses have been completely processed. Hence, at operation 210, any of those buffered key presses of the overloaded key are cleared 210 such that they are not processed and thus completely ignored. Next, a pause period is set 212. Here, the pause period provides a predetermined period of time after the function of the overloaded key switches such that the user of the mobile device can recognize that given the state of the mobile device a different function will now be performed by the overloaded key. The duration of the pause period can vary widely with application and type of overloaded key. In one embodiment, the pause period can be on the order of one (1) to two (2) seconds.

Alternatively, when the decision 208 determines that the function of the key has not just switched, then a decision 214 determines whether the pause period has expired. It should be noted that the pause period is initially set (or defaults) to zero, i.e., no pause, before operation 212 sets a pause period. When the decision 214 determines that the pause period has not yet expired, then the overloaded key press is ignored 216. Hence, any presses of the overloaded key during the pause period are ignored (not processed). On the other hand, when the decision 214 determines that the pause period has expired (e.g., after set 212 or initially as its default state), then the overloaded key press is processed 218. The processing of the overloaded key press operates to perform the current function of the overloaded key (which has recently switched). Following the operations 206, 212, 216 and 218, the overloaded key processing 200 is complete and ends, though the overloading key processing 200 repeats for each key press that has been detected and stored in the buffer.

Figure 3A:
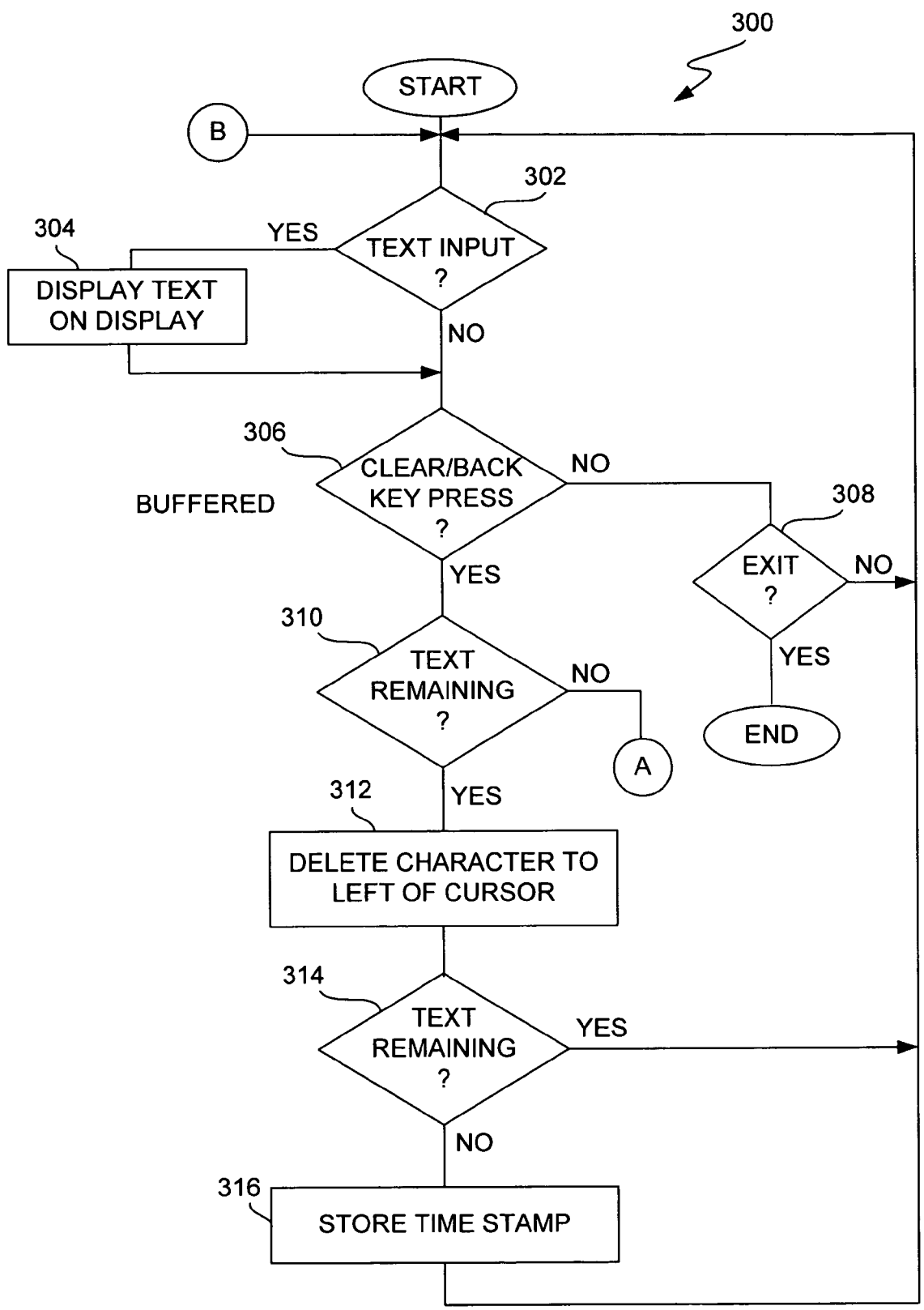
FIGS. 3A–3B are flow diagrams of clear/back processing according to one embodiment of the invention.
Figure 3B:
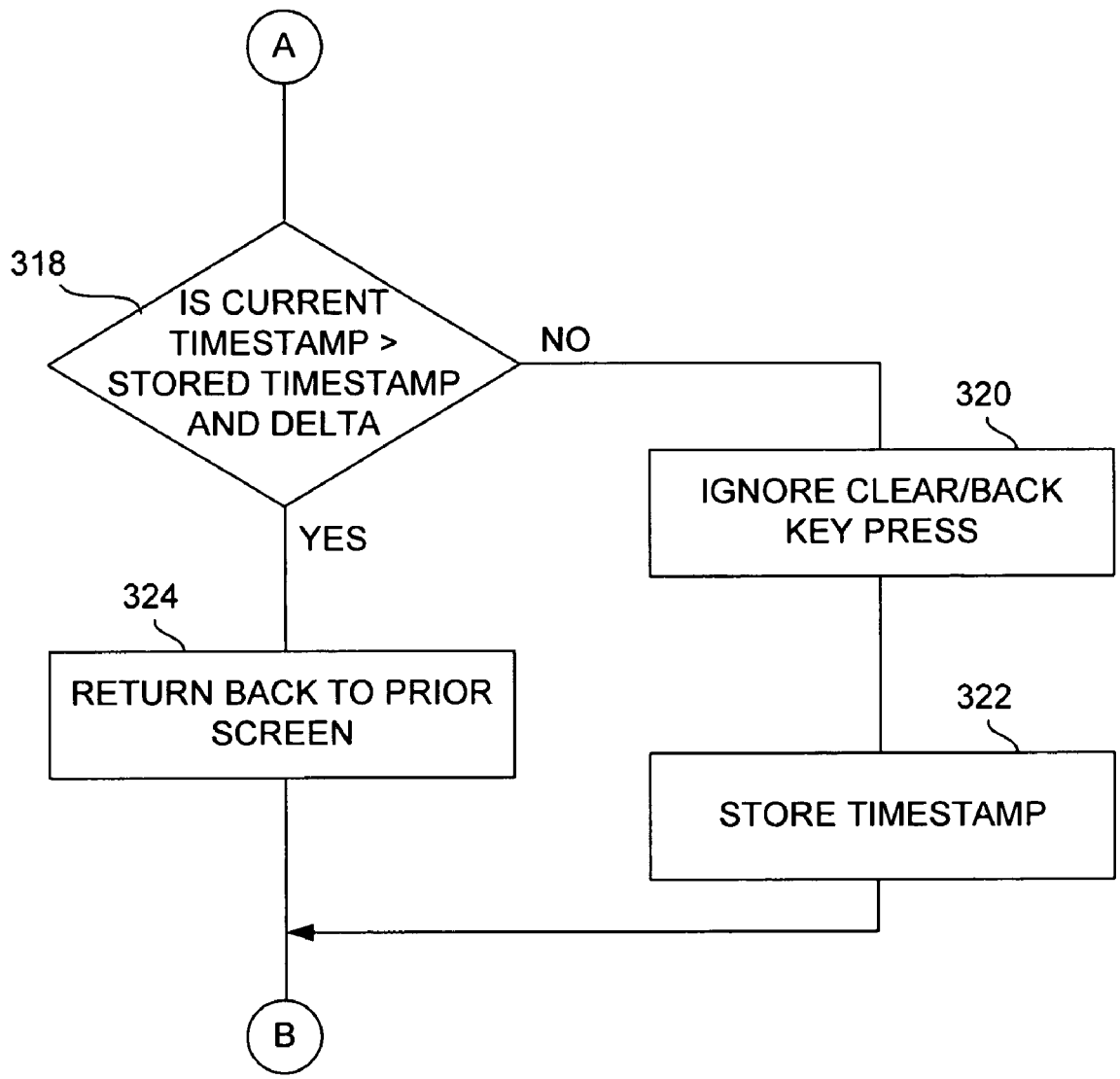

FIGS. 3A–3B are flow diagrams of clear/back processing 300 according to one embodiment of the invention. The clear/back processing 300 is, for example, performed by a mobile device, such as the mobile device 100' illustrated in FIG. 1B. The mobile device 100' provided in FIG. 1B illustrates a representative Clear/Back key 120.

The clear/back processing 300 is associated with processing of an overloaded key press that serves to provide a clear function and a back function. The overloaded key provides the clear function when the user has previously entered input text and the clear function serves to delete the character to the left (or backward) from a cursor position. The overloaded key provides the back function when all of the input text has been cleared (or deleted) and the back function serves to return to a prior screen.

The clear/back processing 300 begins with a decision 302 that determines whether input text has been received. When the decision determines that input text has been received, then the text is displayed 304 on the display. Here, the display is associated with a mobile device that performs the clear/back processing 300. Following operation 304 as well as following the decision 302 when input text is not received, a decision 306 determines whether a Clear/Back key press has been received. Typically, the Clear/Back key press would be received upon a user's depressing of a Clear/Back key of the mobile device (e.g., Clear/Back key 120, FIG. 1B). The Clear/Back key press would then be buffered until processed by the clear/back processing 300. When the decision 306 determines that a Clear/Back key press has not been received, then a decision 308 determines whether the clear/back processing 300 is to be exited. The clear/back processing 300 can be exited in a variety of situations, including the user requesting to exit the clear/back processing 300. In any case, when the decision 308 determines that the clear/back processing 300 is to be exited, then the clear/back processing is complete and ends. Processing of other types of key presses are handled in conventional ways and not part of the clear/back processing 300. Alternatively, when the decision 308 determines that the clear/back processing 300 is not done, then the clear/back processing 300 returns to repeat the decision 302 and subsequent blocks so that additional text can be input and/or detection and processing of additional Clear/Back key presses can be had.

On the other hand, when the decision 306 determines that a Clear/Back key press has been received, then a decision 310 determines whether there is text remaining. Here, text is remaining if the text that has been input by the user still remains. When the decision 310 determines that there is text remaining, then the character to the left of the cursor is deleted 312. Here, the Clear/Back key is operating to perform the clear function. Next, a decision 314 determines whether text is now still remaining. When the decision 314 determines that text is no longer remaining, i.e., all the previously entered text has been deleted, then a timestamp is stored 316. Following the operation 316 as well as following the decision 314 when text is determined to be remaining, the clear/back processing 300 returns to repeat the decision 302 and subsequent blocks so that additional text can be input and/or detection and processing of additional Clear/Back key presses can be had.

Alternatively, when the decision 310 determines that there is no text remaining, then a decision 318 determines whether a current timestamp for the Clear/Back key press now being processed is later than the stored timestamp by more than a predetermined amount. The predetermined amount can be referred to as delta or a threshold delay. In any case, the predetermined amount serves to provide a delay from the stored timestamp during which any Clear/Back key presses that are received will be ignored. In particular, when the decision 318 determines that the current timestamp is not later than the stored timestamp by more than the predetermined amount, the Clear/Back key press is ignored 320. Then, the current timestamp is stored 322 as the stored timestamp. Here, the timestamp is optionally updated at operation 322 so that the delay is guaranteed to be effective (even when Clear/Back key presses have been buffered). Alternatively, when the decision 318 determines that the current timestamp is later than the stored timestamp by more than the predetermined amount, then the display returns 324 back to a prior screen. Here, the Clear/Back key is operating to perform the back function. Following operations 322 and 324, the clear/back processing 300 returns to repeat the decision 302 and subsequent blocks so that additional text can be input and/or detection and processing of additional Clear/Back key presses can be had.

Consider an example in which a user presses a Clear/Back key in rapid succession to clear out previously entered characters. Users tend to hit the Clear/Back key in rapid succession, often more times than the number of characters that can be cleared. However, users tend to not consider that the Clear/Back key can also serve a back function. Instead of permitting the function of the Clear/Back key to switch to the back function during such a sequence, the invention temporarily locks the Clear/Back key in the clear function mode until the user has time to realize that the Clear/Back key has switched to the back function mode. Hence, the invention prevents the user's excessive Clear/Back key presses from causing the back function to operate to display other screens or exit the application.

Figure 4:
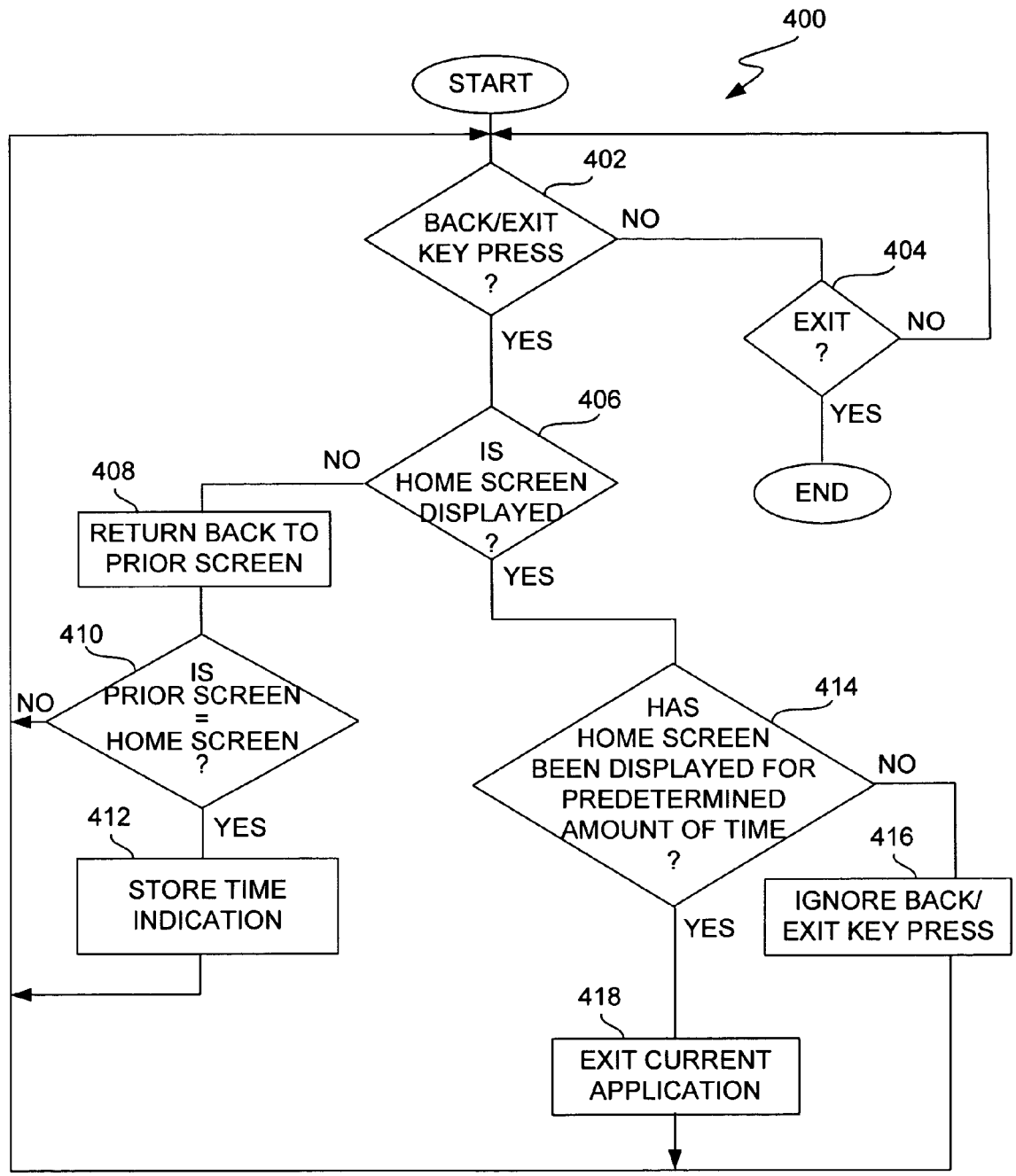
FIG. 4 is a flow diagram of back/exit processing according to one embodiment of the invention.

FIG. 4 is a flow diagram of back/exit processing 400 according to one embodiment of the invention. The back/exit processing 400 is performed when an overloaded key supporting a back function and an exit function is pressed. The back/exit processing 400 is, for example, performed by a mobile device, such as the mobile device 100 illustrated in FIG. 1A. The mobile device 100 provided in FIG. 1A illustrates a representative Back/Exit key 118.

The back/exit processing 400 begins with a decision 402 that determines whether a Back/Exit key press has been received. Typically, the mobile device will receive numerous key presses of various types and store them initially in a buffer. The key presses are sequentially processed as retrieved from a buffer. Here, the decision 402 can determine whether the next key to be processed is a Back/Exit key press. When the decision 402 determines that the key press is not a Back/Exit key press, then a decision 404 determines whether the back/edit processing 400 is to be exited. When the decision 404 determines that the back/exit processing 400 should exit, then the back/exit processing 400 is complete and ends. Typically, the decision 404 will determine that the back/exit processing 400 should end when the user requests to exit the back/exit processing 400. Alternatively, when the decision 404 determines that the back/exit processing 400 should not exit, then the back/exit processing 400 returns to repeat the decision 402 and subsequent blocks.

On the other hand, when the decision 402 determines that the key press is a Back/Exit key press, then a decision 406 determines whether a home screen is currently displayed. Here, the decision 406 determines whether a home screen is currently displayed on a display of the mobile device performing the back/exit processing 400. The home screen can be considered as an initial screen of an application program operating on the mobile device. One such application is a network browser application and it is customary for an initial screen (page) to be referred to as a home screen (page). When the decision 406 determines that the home screen is not currently displayed, then the display of the mobile device returns 408 back to a prior screen. Here, the Back/Exit key press operates to performed a back function. Next, a decision 410 determines whether the prior screen is the home screen. When the decision 410 determines that the prior screen is the home screen, then a time indication is stored 412. In one embodiment, the time indication can represent the time at which the prior screen is presented on the screen by operation 408. Alternatively, when the decision 410 determines that the prior screen is not the home screen, then the operation 412 is bypassed. Following the operation 412 as well as following the decision 410 when the prior screen is not the home screen, the back/exit processing 400 returns to repeat the decision 402 and subsequent blocks so that additional Back/Exit key presses can be processed.

On the other hand, when the decision 406 determines that the home screen is currently displayed, then a decision 414 determines whether the home screen has been displayed for a predetermined amount of time. The time indication previously stored at operation 412 is used as a reference time. The predetermined amount of time can vary with application but, in one embodiment, is on the order of one (1) to two (2) seconds. When the decision 414 determines that the home screen has not been displayed for a predetermined amount of time, the Back/Exit key press is ignored 416. Alternatively, when the decision 414 determines that the home screen has been displayed for at least the predetermined amount of time, the current application is exited 418. Here, the Back/Exit key press operates to performed an exit function. Typically, the home screen is associated with the current application and when pressing the Back/Exit key, the user normally intends to exit the current application. In one embodiment, the current application is a network browser application. Following operations 416 or 418, the back/exit processing 400 returns to repeat the decision 402 and subsequent operations so that additional Back/Exit key presses can be processed.

Consider an example in which a user presses a Back/Exit key several times to back-up or return to an earlier screen, perhaps the home page. Given the use of a buffer (e.g., type-ahead buffer) and the responsiveness or network accessibility limitations of mobile devices, users often press the button too many times. Hence, by the time the processing catches up with the Back/Exit key presses, the function switches to an exit function mode and the application is thus unintentionally exited. With the invention, the home page can be held on the display for a brief period of time while any Back/Exit key presses are ignored so that users can quickly return to the home screen yet will not unexpectedly exit the application.

While Clear/Back and Back/Exit keys were discussed above, it should be recognized that a single key (or button) can be overloaded with more than two functions. For example, a Clear/Back/Exit can be used and can use the above-described processing, separately or in combination, to provide desired behavior.

The advantages of the invention are numerous. Different embodiments or implementations may yield one or more of the following advantages. One advantage of the invention is that an overloaded key operates more in accordance with expected behavior. Another advantage of the invention is that a user will make fewer mistakes and reduce undesired data loss.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for processing an overloaded key on a mobile device, said method comprising:
   receiving a key press of the overloaded key to be processed from a buffer;
   determining whether the function of the overloaded key has switched;
   clearing any additional overloaded key presses of the overloaded key from the buffer when said determining determines that the function of the overloaded key has switched;
   setting a pause period for the overloaded key when said determining determines that the function of the overloaded key has switched, thereby causing subsequent presses of the overloaded key to be ignored during the pause period;
   receiving a subsequent press of the overloaded key;
   determining whether the subsequent press of the overloaded key occurred during the pause period; and
   processing the subsequent press of the overloaded key when said determining determines that the subsequent press of the overloaded key did not occur during the pause period.

2. A method as recited in claim 1, wherein said determining whether the function of the overloaded key has switched comprises determining whether the function of the overloaded key has transitioned from a first function to a second function since its last key press.

3. A method as recited in claim 1, wherein the mobile device is a personal digital assistant or a cellular phone.

4. A method as recited in claim 1, wherein the mobile device is a two-way mobile communication device having limited input keys, one of the input keys being the overloaded key.

5. A method as recited in claim 1,
   wherein the mobile device is a two-way mobile communication device having limited input keys, one of the input keys being the overloaded key; and
   wherein the overloaded key is a Clear/Back key that supports a clear function and a back function.

6. A computer readable medium including at least computer program code for processing an overloaded key on a mobile device, said computer readable medium comprising:
   computer program code for receiving a key press of the overloaded key to be processed from a buffer;
   computer program code for determining whether the function of the overloaded key has switched;
   computer program code for clearing any additional overloaded key presses of the overloaded key from the buffer when said computer program code for determining determines that the function of the overloaded key has switched; and
   computer program code for setting a pause period for the overloaded key when said computer program code for determining determines that the function of the overloaded key has switched, thereby causing subsequent presses of the overloaded key to be ignored during the pause period;

computer program code for receiving a subsequent press of the overloaded key;

computer program code for determining whether the subsequent press of the overloaded key occurred during the pause period; and computer program code for processing the subsequent press of the overloaded key when said determining determines that the subsequent press of the overloaded key did not occur during the pause period.

7. A computer readable medium as recited in claim 6, wherein the mobile device is a two-way mobile communication device having limited input keys, one of the input keys being the overloaded key; and wherein the overloaded key is a Clear/Back key that supports a clear function and a back function.

8. A computer readable medium as recited in claim 6 wherein the mobile device is a personal digital assistant or a cellular phone.

9. A mobile device, comprising:

a display configured to display text entered by a user;

a keypad to facilitate text entry by the user, said keypad including at least an overloaded key that serves a plurality of functions;

a buffer for storing key presses entered by the user via said keypad; and a processor configured to control operation of said mobile device, said processor being configured to provide context sensitive processing overloaded key presses by operating to receive a key press of the overloaded key to be processed from said buffer, determine whether the function of the overloaded key has switched, and clear any additional overloaded key presses of the overloaded key from said buffer when it is determined that the function of the overloaded key has switched, wherein said processor further operates to set a pause period for the overloaded key when it is determined that the function of the overloaded key has switched, thereby causing subsequent presses of the overloaded key to be ignored during the pause period, receive a subsequent press of the overloaded key, determine whether the subsequent press of the overloaded key occurred during the pause period, and process the subsequent press of the overloaded key when it is determined that the subsequent press of the overloaded key did not occur during the pause period.

10. A method for processing an overloaded key on a mobile device, said method comprising:

receiving a key press of the overloaded key to be processed;

determining whether the function of the overloaded key has switched;

determining whether a pause period has expired when said determining determined that the function of the overloaded key has switched;

ignoring the overload key when said determining determines that the pause period has not expired;

processing the overload key when said determining determines that the pause period has expired;

determining whether a subsequent press of the overloaded key occurred during the pause period; and processing the subsequent press of the overloaded key when said determining determines that the subsequent press of the overloaded key did not occur during the pause period.

* * * * *